US012195951B2

(12) United States Patent
Kondo et al.

(10) Patent No.: US 12,195,951 B2
(45) Date of Patent: Jan. 14, 2025

(54) HYDRAULIC PUMP SYSTEM AND CONTROL DEVICE

(71) Applicant: KAWASAKI JUKOGYO KABUSHIKI KAISHA, Kobe (JP)

(72) Inventors: Akihiro Kondo, Kobe (JP); Hideyasu Muraoka, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 127 days.

(21) Appl. No.: 17/758,510

(22) PCT Filed: Dec. 9, 2020

(86) PCT No.: PCT/JP2020/045942

§ 371 (c)(1),
(2) Date: Jul. 7, 2022

(87) PCT Pub. No.: WO2021/140821

PCT Pub. Date: Jul. 15, 2021

(65) Prior Publication Data

US 2023/0049890 A1 Feb. 16, 2023

(30) Foreign Application Priority Data

Jan. 10, 2020 (JP) ................................ 2020-002529

(51) Int. Cl.
*E02F 9/22* (2006.01)
*F15B 11/02* (2006.01)

(52) U.S. Cl.
CPC ............ *E02F 9/2221* (2013.01); *F15B 11/02* (2013.01)

(58) Field of Classification Search
CPC ........ F15B 2211/50536; F15B 11/0423; F15B 2211/20553; E02F 9/2221
See application file for complete search history.

(56) References Cited

U.S. PATENT DOCUMENTS

| | | | | |
|---|---|---|---|---|
| 6,202,411 | B1 * | 3/2001 | Yamashita | E02F 9/2235 60/452 |
| 2011/0000197 | A1 * | 1/2011 | Kamiya | F02D 41/0255 60/295 |
| 2020/0217046 | A1 | 7/2020 | Kondo et al. | |

FOREIGN PATENT DOCUMENTS

| | | |
|---|---|---|
| JP | H05057052 U | 7/1993 |
| JP | 2010071425 A | 4/2010 |

(Continued)

*Primary Examiner* — Abiy Teka
(74) *Attorney, Agent, or Firm* — Alleman Hall & Tuttle LLP

(57) ABSTRACT

This hydraulic pump system includes: a hydraulic pump having a discharge flow rate that is changeable; a regulator device that adjusts the discharge flow rate of the hydraulic pump; an operation device including an operation tool; a lock switching input unit that unlocks the operation tool; an unloader valve that adjusts a discharge pressure of the hydraulic pump by changing the opening area of the unloader valve; and a control device that controls movement of the unloader valve. When a predetermined actuation condition is satisfied, the control device causes the unloader valve to reduce the opening area to increase the discharge pressure of the hydraulic pump. The regulator device increases the discharge flow rate after the control device causes an increase in the discharge pressure of the hydraulic pump. The actuation condition includes a condition that the lock switching input unit has unlocked the operation tool.

6 Claims, 3 Drawing Sheets

(56) References Cited

FOREIGN PATENT DOCUMENTS

| | | | | | |
|---|---|---|---|---|---|
| JP | 2018084196 | A | * | 5/2018 | ................ E02F 9/22 |
| JP | 2018179199 | A | | 11/2018 | |
| JP | 2019052703 | A | | 4/2019 | |

* cited by examiner

HYDRAULIC PUMP SYSTEM AND CONTROL DEVICE

TECHNICAL FIELD

The present invention relates to a hydraulic pump system in which the discharge flow rate of a hydraulic pump is changeable.

BACKGROUND ART

Construction equipment or the like includes a hydraulic pump system in which the discharge flow rate of a hydraulic pump can be changed according to the driving state, etc., of a hydraulic actuator. One known example of the hydraulic pump system is that disclosed in Patent Literature (PTL) 1, for example. In the hydraulic pump system disclosed in PTL 1, which includes a hydraulic pump of the variable capacity type, the tilt angle of a swash plate changes, in other words, the discharge flow rate of the hydraulic pump changes, in accordance with the driving state, etc., of a hydraulic actuator.

CITATION LIST

Patent Literature

PTL 1: Japanese Laid-Open Patent Application Publication No. 2018-179199

SUMMARY OF INVENTION

Technical Problem

In the hydraulic pump system disclosed in PTL 1, the tilt angle is changed using the pressure of an operating oil discharged from the hydraulic pump, namely, a discharge pressure. Therefore, it is not possible to obtain a sufficient wobbling force to change the tilt angle when the discharge pressure of the hydraulic pump is low. Accordingly, it is necessary to wait until the discharge pressure increases, resulting in poor tracking performance of the discharge flow rate that follows operation of an operation tool.

Thus, an object of the present invention is to provide a hydraulic pump system and a control device in which the tracking performance of a discharge flow rate that follows operation of an operation tool can be further improved.

Solution to Problem

A hydraulic pump system according to the first invention includes: a hydraulic pump having a discharge flow rate that is changeable; a regulator device that adjusts the discharge flow rate of the hydraulic pump; an operation device including an operation tool; a lock switching input unit that switches a state of locking of the operation tool; an unloader valve that adjusts a discharge pressure of the hydraulic pump by changing an opening area of the unloader valve; and a control device that controls movement of the unloader valve. When a predetermined actuation condition is satisfied, the control device causes the unloader valve to reduce the opening area to increase the discharge pressure of the hydraulic pump. The regulator device increases the discharge flow rate of the hydraulic pump after the control device causes an increase in the discharge pressure of the hydraulic pump. The actuation condition includes a condition that the lock switching input unit has unlocked the operation tool.

According to the present invention, when the operation tool is unlocked, the discharge pressure increases, and thus it is possible to obtain a sufficient wobbling force to change the tilt angle when the operation tool is operated. Therefore, it is possible to improve the tracking performance of the discharge flow rate that follows the amount of operation.

A control device according to the second invention performs the following: controlling a regulator device that increases a discharge flow rate, which is changeable, of a hydraulic pump of a variable capacity type according to an increase in a discharge pressure of the hydraulic pump, and controlling movement of an unloader valve that adjusts the discharge pressure of the hydraulic pump by changing an opening area of the unloader valve; switching a state of locking of an operation tool according to operation of a lock switching input unit; and causing the unloader valve to reduce the opening area to increase the discharge pressure of the hydraulic pump when a predetermined actuation condition is satisfied. The actuation condition includes a condition that the lock switching input unit has unlocked the operation tool.

According to the second invention, when the operation tool is unlocked, the discharge pressure increases, and thus it is possible to obtain a sufficient wobbling force to change the tilt angle when the operation tool is operated. Therefore, it is possible to improve the tracking performance of the discharge flow rate that follows the amount of operation.

Advantageous Effects of Invention

According to the first and second inventions, it is possible to further improve the tracking performance of the discharge flow rate that follows the operation of the operation tool.

The above object, other objects, features, and advantages of the present invention will be made clear by the following detailed explanation of preferred embodiments with reference to the attached drawings.

DESCRIPTION OF EMBODIMENTS

Hereinafter, hydraulic pump systems 1, 1A according to the first and second embodiments according to the present invention will be described with reference to the drawings. Note that each of the hydraulic pump systems 1, 1A described below is merely one embodiment of the present invention. Thus, the present invention is not limited to the embodiments and may be subject to addition, deletion, and alteration within the scope of the essence of the present invention.

Embodiment 1

Figure 1:
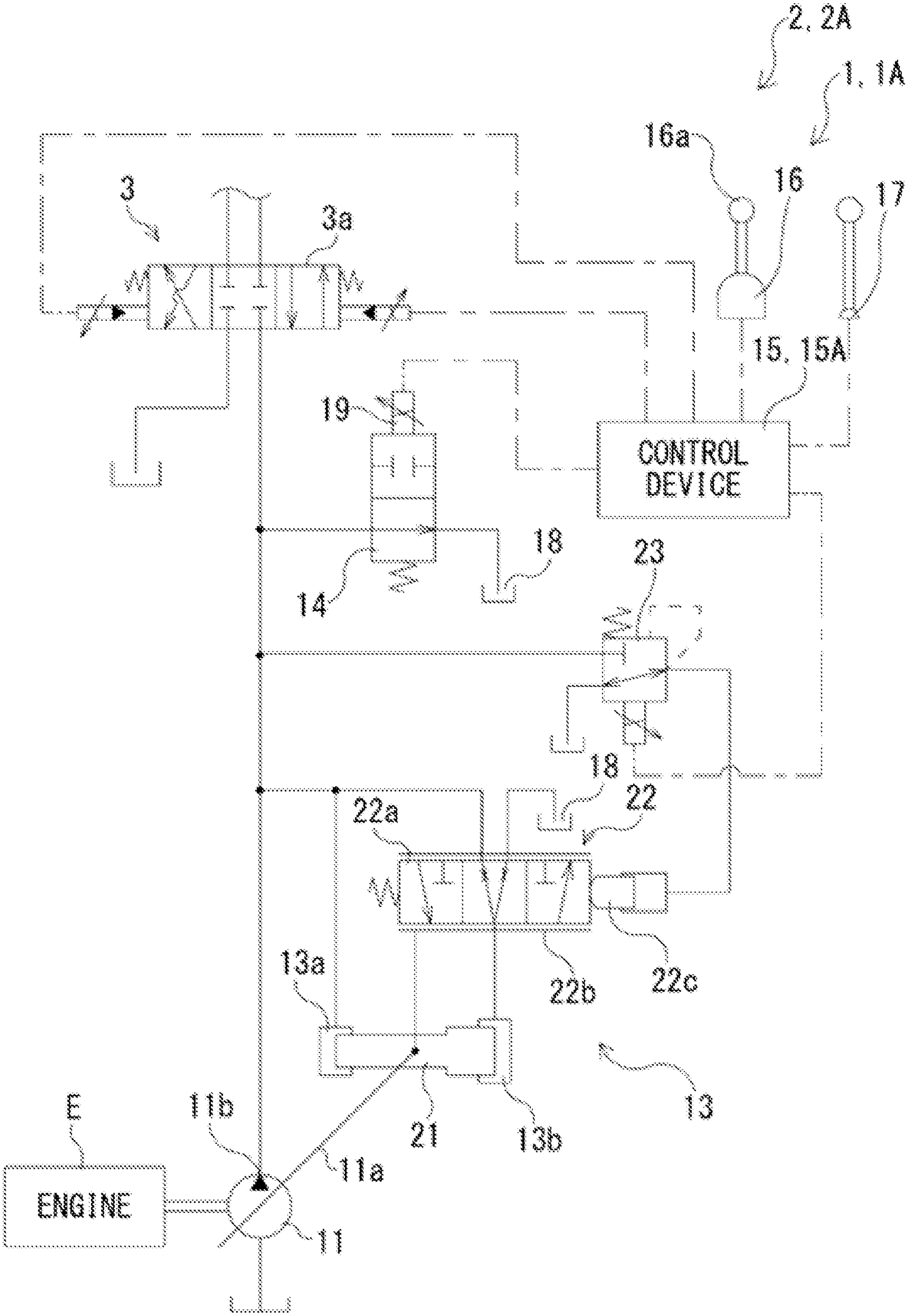
FIG. 1 is a hydraulic circuit representing a hydraulic pump system according to the first and second embodiments.

Construction equipment such as a hydraulic excavator includes a hydraulic drive system 2 such as that illustrated in FIG. 1, in order to drive hydraulic actuators (not illustrated in the drawings) such as a hydraulic cylinder and a hydraulic motor. The hydraulic drive system 2 includes the hydraulic pump system 1 and a directional control valve 3. The hydraulic pump system 1 includes a hydraulic pump 11, a regulator device 13, an unloader valve 14, a control device 15, an operation device 16, and a lock switching input unit 17. The hydraulic pump 11, which is rotated by an engine E, discharges an operating oil. The hydraulic pump 11 is connected to the hydraulic actuator via the directional control valve 3, and the directional control valve 3 switches the direction and the flow rate of the operating oil that flows to the hydraulic actuator. In other words, the directional control valve 3 includes a spool 3*a*, and the spool 3*a* in the neutral position blocks the path between the hydraulic pump 11 and the hydraulic actuator. Furthermore, the spool 3*a* moves from the neutral position to change the direction and the flow rate of the operating oil, and it is possible to move the hydraulic actuator at a desired speed by moving the spool 3*a*.

Furthermore, the hydraulic pump 11 has a changeable discharge capacity; in the present embodiment, the hydraulic pump 11 is a swash plate pump of the variable capacity type. Specifically, the hydraulic pump 11, which includes a swash plate 11*a*, can change the discharge capacity by changing the tilt angle of the swash plate 11*a*. Furthermore, the regulator device 13 is provided on the swash plate 11*a*. Note that the hydraulic pump 11 is not limited to the swash plate pump and may be a bent axis pump. The regulator device 13, which includes a servo piston 21, an adjustment valve 22, and a flow rate control proportional valve 23, adjusts the discharge capacity by changing the tilt angle of the swash plate 11*a*.

The servo piston 21 is coupled to the swash plate 11*a*, and when the servo piston 21 moves along the axis thereof, the tilt angle of the swash plate 11*a* changes. More specifically, the servo piston 21 includes two pressure-receiving portions. A first pressure-receiving portion formed to have a small diameter receives a discharge pressure guided to a first pressure-receiving chamber 13*a*, and a second pressure-receiving portion formed to have a large diameter receives a control pressure guided to a second pressure-receiving chamber 13*b*. With the pressure acting on the first pressure-receiving chamber 13*a*, the swash plate 11*a* wobbles to tilt more, and with the pressure acting on the second pressure-receiving chamber 13*b*, the swash plate 11*a* wobbles to tilt less. Subsequently, the servo piston 21 moves to a position at which the force acting on the pressure-receiving portions is balanced. In this manner, by changing the control pressure, it is possible to adjust the position of the servo piston 21 to increase or decrease the discharge flow rate. Furthermore, the adjustment valve 22 is connected to the second pressure-receiving chamber 13*b* in order to adjust the control pressure.

The adjustment valve 22, which includes a spool 22*a*, a sleeve 22*b*, and a flow rate control piston 22*c*, adjusts the control valve by moving the spool 22*a*. More specifically, the flow rate control proportional valve 23 is provided on the adjustment valve 22. The flow rate control proportional valve 23 receives the discharge pressure of the hydraulic pump 11 as a primary pressure, and outputs an operating pressure which is a secondary pressure corresponding to a command signal input thereto. The operating pressure acts on the spool 22*a* via the flow rate control piston 22*c*, and the spool 22*a* moves in a flow rate increase direction (leftward in FIG. 1; the right position as the position of the spool 22*a* in FIG. 1) and a flow rate decrease direction (rightward in FIG. 1; the left position as the position of the spool 22*a* in FIG. 1) according to the operating pressure. When the spool 22*a* moves in the flow rate increase direction, the second pressure-receiving chamber 13*b* is connected to the tank 18, and the control pressure is reduced. Thus, the servo piston 21 moves toward the second pressure-receiving chamber 13*b*, and the tilting of the swash plate 11*a* increases, in other words, the discharge amount increases. In contrast, when the spool 22*a* moves in the flow rate decrease direction, the second pressure-receiving chamber 13*b* is connected to a discharge port 11*b* of the hydraulic pump 11, and the control pressure increases. Thus, the servo piston 21 moves toward the first pressure-receiving chamber 13*a*, and the tilting of the swash plate 11*a* is reduced, in other words, the discharge amount is reduced.

The sleeve 22*b*, which operates in conjunction with the servo piston 21, is exteriorly provided on the spool 22*a*. The sleeve 22*b* moves to a position at which thrust due to the hydraulic pressure in the second pressure-receiving chamber 13*b* and thrust due to the hydraulic pressure in the first pressure-receiving chamber 13*a* are balanced (a relative position for the spool 22*a*). More specifically, the aforementioned control pressure is a pressure in the middle between two series-connected throttles (not illustrated in the drawings) in the passage extending from the discharge port 11*b* of the hydraulic pump 11 to the tank 18. Thus, the servo piston 21 stops at a position corresponding to the spool 22*a*. In this manner, by moving the spool 22*a* to the position corresponding to the command signal input to flow rate control proportional valve 23, the adjustment valve 22 can change the discharge flow rate of the hydraulic pump 11 into a flow rate corresponding to the command signal.

The hydraulic pump system 1 configured as described above includes the unloader valve 14 as mentioned earlier. The unloader valve 14 is connected to the discharge port 11*b* of the hydraulic pump 11 in parallel with the directional control valve 3 and is connected to the tank 18. The unloader valve 14, which drains the operating oil to the tank 18 at the flow rate to unload the hydraulic pump 11, further includes the following functions. Specifically, an electromagnetic proportional valve 19 is provided on the unloader valve 14 in the present embodiment. The electromagnetic proportional control valve 19 outputs a pilot pressure according to a command signal input thereto, and the unloader valve 14 changes the opening area according to the pilot pressure. Thus, the operating oil is drained to the tank 18 at the flow rate corresponding to the opening area of the unloader valve 14, and the discharge pressure of the hydraulic pump 11 is adjusted. The unloader valve 14 including these functions is electrically connected to the control device 15.

The control device 15 is electrically connected to the directional control valve 3 and the flow rate control proportional valve 23 in addition to the electromagnetic proportional valve 19 on the unloader valve 14; the control device 15 outputs command signals to these valves 3, 19, 23 to control the movement thereof. Furthermore, the operation device 16 and the lock switching input unit 17 are electrically connected to the control device 15. The operation device 16, which is used to operate the hydraulic actuator, is an electric joystick in the present embodiment. Note that the operation device 16 is not limited to the electric joystick and may be a pilot operation valve to be used in combination with a pressure sensor capable of obtaining the output pressure of the pilot operation valve.

The operation device 16 includes an operation lever 16*a* which is the operation tool, and the control device 15 moves the spool 3*a* of the directional control valve 3 from the neutral position according to the amount of operation of the operation lever 16*a*. Thus, the hydraulic actuator operates according to the amount of operation of the operation lever 16*a*. Furthermore, the control device 15 causes the electromagnetic proportional valve 19 to output the pilot pressure corresponding to the amount of operation of the operation lever 16*a*, thereby closing the unloader valve 14 or reducing the opening area thereof. Accordingly, the discharge pressure of the hydraulic pump 11 increases, and the pressure in the first pressure-receiving chamber 13*a* increases; thus, the discharge flow rate of the hydraulic pump 11 increases.

The lock switching input unit 17, which is used to select whether to lock or unlock a function of the operation device 16, is a lever or the like in the present embodiment. Note that the lock switching input unit 17 is not limited to the lever and may be an on/off switch or the like. When the lock switching input unit 17 is operated, the control device 15 switches the state of locking between ON and OFF. When the state of locking is ON, the control device 15 negates the operation of the operation lever 16*a* and maintains the spool 3*a* of the directional control valve 3 in the neutral position regardless of the amount of operation of the operation lever 16*a*. In contrast, when the state of locking is OFF, the control device 15 accepts the operation of the operation lever 16*a* and moves the spool 3*a* of the directional control valve 3 according to the amount of operation of the operation lever 16*a*.

Figure 2:
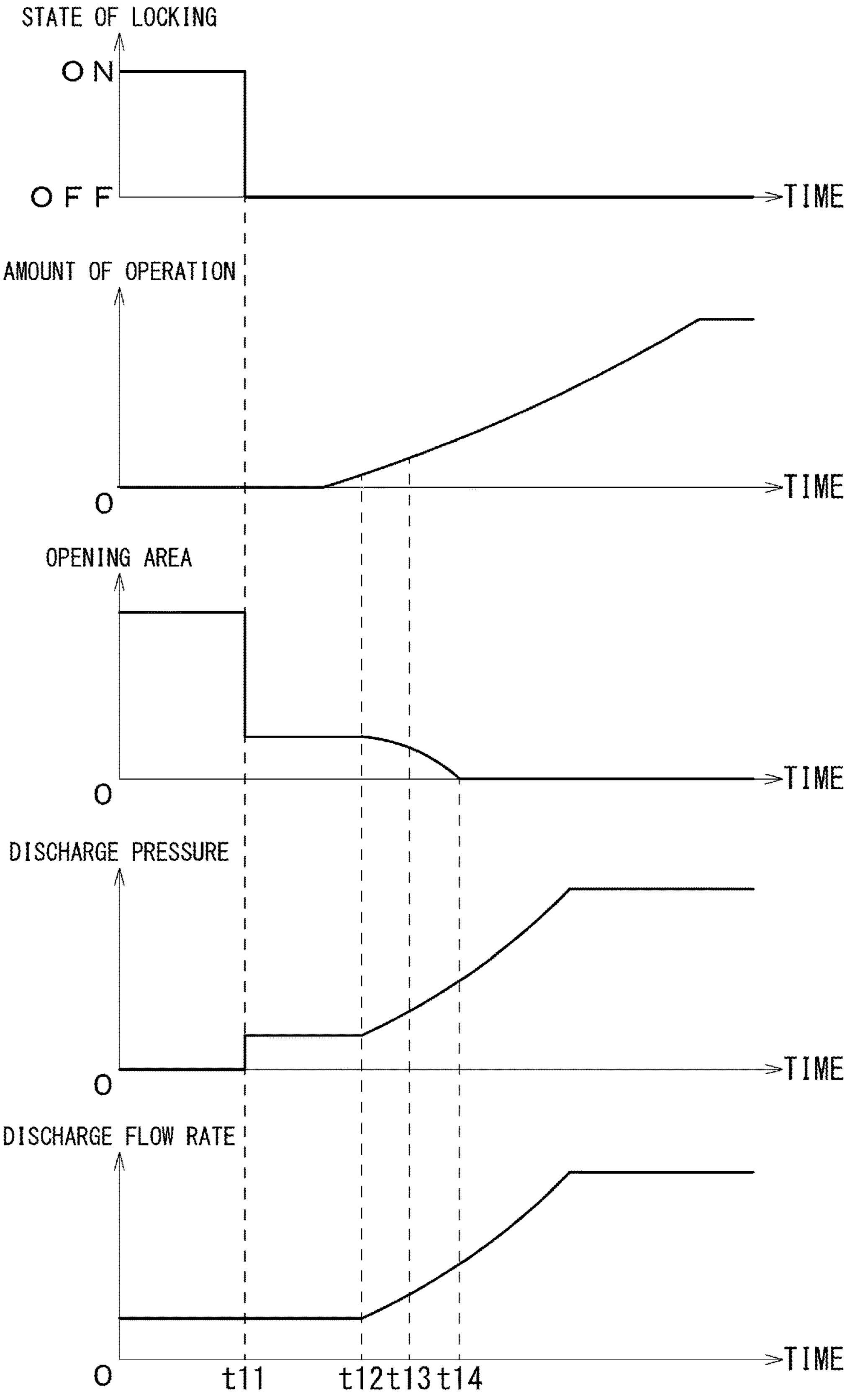
FIG. 2 is a graph showing temporal changes in various status values in a hydraulic pump system according to the first embodiment.

In the hydraulic pump system 1 configured as described above, in a neutral state in which the operation lever 16*a* is located in the neutral position, the control device 15 stops the output of the flow rate control proportional valve 23 to guide the discharge pressure to the second pressure-receiving chamber 13*b*. Accordingly, the servo piston 21 moves toward the first pressure-receiving chamber 13*a* to set the discharge flow rate of the hydraulic pump 11 to the minimum flow rate. Furthermore, when the state of locking is ON in the neutral state (in other words, when the actuation condition to be described later is not satisfied), the control device 15 sets, as the opening area of the unloader valve 14, a predetermined first opening area (for example, an opening area that is at least 80% as large as the maximum opening area), which is the maximum opening area in the present embodiment, to place the hydraulic pump 11 in the unloaded state. Thus, the control device 15 reduces power loss in the hydraulic pump system 1. Subsequently, when the state of locking is switched from ON to OFF and the operation lever 16*a* is operated as illustrated in FIG. 2, the control device 15 performs the following processes. Note that the vertical axes of the graphs illustrated in FIG. 2 represent, in the order from the top, the state of locking, the amount of operation of the operation lever 16*a*, the opening area of the unloader valve 14, the discharge pressure of the hydraulic pump 11, and the discharge flow rate of the hydraulic pump 11, and the horizontal axes of the graphs illustrated in FIG. 2 represent elapsed time. The same applies to the graphs illustrated in FIG. 3 to be described later.

Specifically, when the predetermined actuation condition is satisfied, in other words, when the state of locking is switched to OFF (in other words, when unlocked), the control device 15 places the unloader valve 14 in the standby state. The standby state is a state in which the unloader valve 14 is closed until the opening area thereof is a predetermined second opening area refer to time t11 in FIG. 2) as a result of actuation of the electromagnetic proportional valve 19. Note that the second opening area is such that the discharge pressure of the hydraulic pump 11 is between 0.6 MPa and 5.0 MPa, inclusive, for example; specifically, the second opening area is 1% or more, but less than 30%, of the maximum opening area, and in the present embodiment, the second opening area is 5% of the maximum opening area. By placing the unloader valve 14 in the standby state, it is possible to increase the discharge pressure of the hydraulic pump 11 and guide the operating oil with the increased pressure to the first pressure-receiving chamber 13*a*. Thus, it is possible to obtain a sufficient wobbling force to change the tilt angle of the swash plate 11*a* of the hydraulic pump 11 when the operation lever 16*a* is operated, and it is possible to improve the tracking performance of the discharge flow rate of the hydraulic pump 11 that follows the amount of operation.

Furthermore, when the operation lever 16*a* is operated in the state where the actuation condition is satisfied, at a point in time when the amount of operation of the operation lever 16*a*exceeds a first predetermined amount (refer to time t12 in FIG. 2), the control device 15 increases the output of the electromagnetic proportional valve 19 according to the amount of operation and further reduces the opening area of the unloader valve 14. Therefore, the hydraulic pump 11 discharges the operating oil at the discharge flow rate corresponding to the amount of operation. Subsequently, when the amount of operation reaches a third operation amount (refer to time t14 in FIG. 2) after exceeding a second predetermined amount (refer to time t13 in FIG. 2), the control device 15 completely closes the unloader valve 14. Note that the second predetermined amount is an amount of operation with which the directional control valve 3 is opened to start supplying the operating oil to the hydraulic actuator.

By beginning to close the unloader valve 14 when the amount of operation is the first predetermined amount which is smaller than the second predetermined amount, it is possible to quickly increase the discharge flow rate.

Embodiment 2

In a hydraulic pump system 1A according to Embodiment 2, which includes the same elements as those included in the hydraulic pump system 1 according to Embodiment 1, a control device 15A performs processes different from the processes performed in Embodiment 1. Therefore, regarding the hydraulic pump system 1A according to Embodiment 2, the processes performed by the control device 15A will be mainly described; the elements of the hydraulic pump system 1A according to Embodiment 2 are assigned the same reference signs as those of the hydraulic pump system 1 according to Embodiment 1 and as such, description of the elements of the hydraulic pump system 1A according to Embodiment 2 will be omitted.

Figure 3:
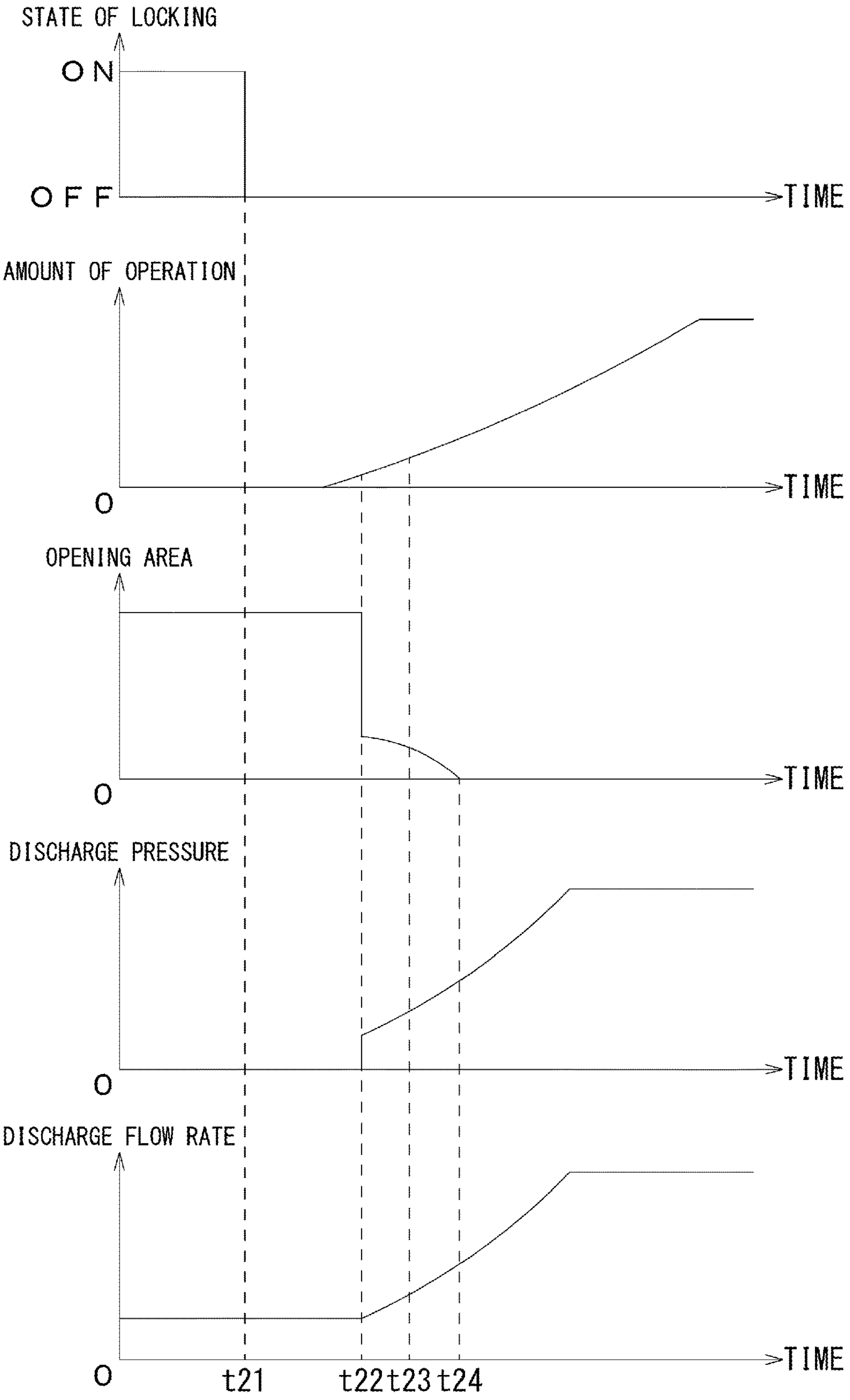
FIG. 3 is a graph showing temporal changes in various status values in a hydraulic pump system according to the second embodiment.

In the hydraulic pump system 1A, the actuation condition includes a condition that the operation lever 16*a* is operated and the amount of operation is at least the first predetermined amount, and the control device 15A maintains the opening area of the unloader valve 14 at the maximum opening area even after the state of locking is switched to OFF as shown in FIG. 3 (refer to time t21 in FIG. 3). Thus, it is possible to reduce power loss in the hydraulic pump system 1A. Subsequently, when the amount of operation reaches the first predetermined amount as a result of the operation lever 16*a*, the control device 15A places the unloader valve 14 in the standby state (refer to time t22 in FIG. 3). Thereafter, as the amount of operation further increases, the unloader valve 14 is further closed according to the amount of operation (refer to time t23 in FIG. 3); when the amount of operation reaches the third operation amount (refer to time t24 in FIG. 3) after exceeding the second predetermined amount (refer to time t23 in FIG. 3), the control device 15A completely closes the unloader valve 14.

The hydraulic pump system 1A configured as described above produces substantially the same advantageous effects as the hydraulic pump system 1 according to Embodiment 1, in addition to the aforementioned reduction in the power loss before the operation lever 16*a* is operated.

Other Embodiments

In the hydraulic pump systems 1, 1A according to the above embodiments, the unloader valve 14 is connected to the hydraulic pump 11 in parallel with the directional control valve 3, but does not necessarily need to be connected in this manner. For example, when the directional control valve 3 includes a center bypass passage, the unloader valve 14 may be interposed in the center bypass passage, on the downstream side of the directional control valve 3, and if there is a valve that is separate from the directional control valve 3 and can increase the discharge pressure of the hydraulic pump 11 (in other words, a valve with which the passage area can be reduced), substantially the same advantageous effects are produced. Furthermore, the elements of the regulator device 13 are not limited to the elements described above; it is sufficient that the regulator device 13 include elements capable of adjusting the discharge flow rate using the discharge pressure of the hydraulic pump 11.

Furthermore, in the hydraulic pump systems 1, 1A according to the above embodiments, the second opening area of the unloader valve 14 has a constant value, but the second opening area may be changed according to the rotational speed of the hydraulic pump 11. Specifically, the control device 15 may obtain the rotational speed of the hydraulic pump 11 and change the second opening area accordingly.

From the foregoing description, many modifications and other embodiments of the present invention would be obvious to a person having ordinary skill in the art. Therefore, the foregoing description should be interpreted only as an example and is provided for the purpose of teaching the best mode for carrying out the present invention to a person having ordinary skill in the art. Substantial changes in details of the structures and/or functions of the present invention are possible within the spirit of the present invention.

REFERENCE CHARACTERS LIST

1, 1A hydraulic pump system
11 hydraulic pump
13 regulator device
14 unloader valve
15, 15A control device
16 operation device
16*a* operation lever (operation tool)
17 lock switching input unit

The invention claimed is:

1. A hydraulic pump system comprising:
- a hydraulic pump having a discharge flow rate that is changeable;
- a regulator device that adjusts the discharge flow rate of the hydraulic pump;
- an operation device including an operation tool;
- a lock switching input unit that switches a state of locking of the operation tool;
- an unloader valve that adjusts a discharge pressure of the hydraulic pump by changing an opening area of the unloader valve; and
- a control device that controls movement of the unloader valve, wherein:
  - when a predetermined actuation condition is satisfied, the control device causes the unloader valve to reduce the opening area to increase the discharge pressure of the hydraulic pump;
  - after the control device causes an increase in the discharge pressure of the hydraulic pump, the regulator device increases the discharge flow rate of the hydraulic pump according to the increase in the discharge pressure of the hydraulic pump; and
  - the actuation condition includes a condition that the lock switching input unit has unlocked the operation tool and a condition that an amount of operation of the operation tool is greater than or equal to a predetermined amount.

2. The hydraulic pump system according to claim 1, wherein:
- when the operation tool is operated while the actuation condition is satisfied, the control device causes the unloader valve to reduce the opening area according to the amount of the operation of the operation tool.

3. The hydraulic pump system according to claim 1, wherein:
- when the actuation condition is not satisfied, the control device causes the unloader valve to maximize the opening area.

4. A control device that performs the following:
- controlling a regulator device that increases a discharge flow rate, which is changeable, of a hydraulic pump of a variable capacity type according to an increase in a discharge pressure of the hydraulic pump, and controlling movement of an unloader valve that adjusts the discharge pressure of the hydraulic pump by changing an opening area of the unloader valve;
- switching a state of locking of an operation tool according to operation of a lock switching input unit; and
- when a predetermined actuation condition is satisfied, after causing the unloader valve to reduce the opening area to increase the discharge pressure of the hydraulic pump, causing the regulator device to increase the discharge flow rate of the hydraulic pump according to the increase in the discharge pressure of the hydraulic pump, wherein:
- the actuation condition includes a condition that the lock switching input unit has unlocked the operation tool and a condition that an amount of operation of the operation tool is greater than or equal to a predetermined amount.

5. A hydraulic pump system comprising:
- a hydraulic pump having a discharge flow rate that is changeable;
- a regulator device that adjusts the discharge flow rate of the hydraulic pump;
- an operation device including an operation tool;
- a lock switching input unit that switches a state of locking of the operation tool;
- an unloader valve that adjusts a discharge pressure of the hydraulic pump by changing an opening area of the unloader valve; and
- a control device that controls movement of the unloader valve and when a predetermined actuation condition is satisfied, causes the unloader valve to reduce the opening area to increase the discharge pressure of the hydraulic pump, wherein:
- after the control device causes an increase in the discharge pressure of the hydraulic pump, the regulator device increases the discharge flow rate of the hydraulic pump according to the increase in the discharge pressure of the hydraulic pump; and the actuation condition includes a condition that the lock switching input unit has unlocked the operation tool.

6. A hydraulic pump system comprising:

a hydraulic pump having a discharge flow rate that is changeable;

a regulator device that adjusts the discharge flow rate of the hydraulic pump;

an operation device including an operation tool;

a lock switching input unit that switches a state of locking of the operation tool;

an unloader valve that adjusts a discharge pressure of the hydraulic pump by changing an opening area of the unloader valve; and a control device that controls movement of the unloader valve and when a predetermined actuation condition is satisfied, causes the unloader valve to reduce the opening area to increase the discharge pressure of the hydraulic pump, wherein:

after the control device causes an increase in the discharge pressure of the hydraulic pump, the regulator device increases the discharge flow rate of the hydraulic pump according to the increase in the discharge pressure of the hydraulic pump;

the actuation condition includes a condition that the lock switching input unit has unlocked the operation tool; and when the actuation condition is not satisfied, the control device causes the unloader valve to maximize the opening area.

* * * * *